United States Patent Office 2,838,256
Patented June 10, 1958

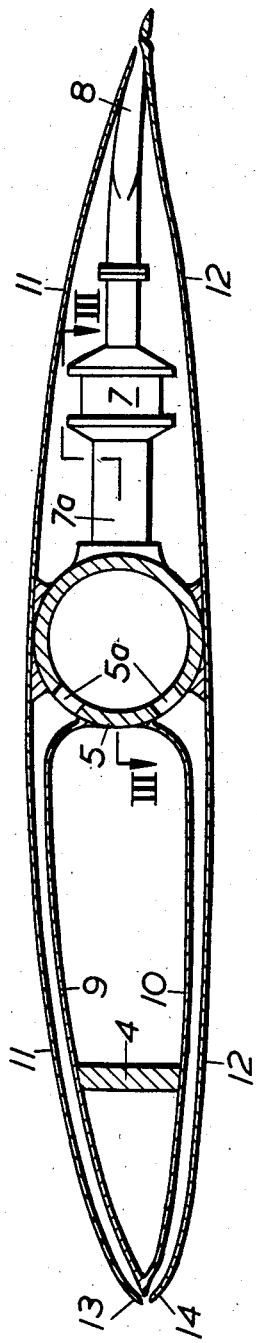
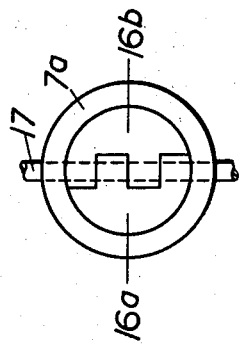
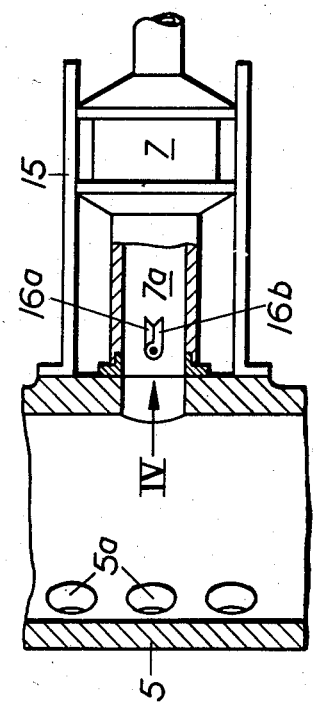

2,838,256

WING MOUNTED JET PROPULSION SYSTEM FOR AIRCRAFT

Ivor Macaulay Davidson, Farnborough, and Norman Albert Dimmock, Woking, England, assignors to Power Jets (Research and Development) Limited, London, England, a British company Application January 28, 1955, Serial No. 484,658

Claims priority, application Great Britain February 11, 1954

5 Claims. (Cl. 244—15)

This invention relates to a jet-propelled aircraft wherein the jet engines draw their air supply from passages in the interior of the hollow wing of the aircraft and the inlet to the wing interior for each engine is constituted by a continuous or divided slot along the leading edge of the wing, the whole length of the leading edge, as nearly as possible up to each wing tip, being slotted. The air entering such an inlet serves also to effect boundary layer suction.

According to the invention, there are several jet engines in common air-supply connection with one inlet slot. As compared with an arrangement having a divided slot from which each engine has its own air supply path, segregated from the paths to the others, the arrangement according to the invention has the advantage that when one engine is shut down, there is at least one engine drawing air from the common inlet, so that intake of air continues along the whole of the slotted edge of the wing.

Preferably each of the said engines draws its air from the interior of the wing through a non-return valve which thus prevents suction from an engine which is shut down through an engine which is running; the valve may consist of a pair or a group of flaps.

Since the stiffeners extending across the wing will in effect segregate the inlet paths and divide the slotted edge of the wing into a series of slots, it is an important feature of the invention that several inlet paths all discharge into a common manifold in the wing, from which manifold several engine inlet conduits are branched; a hollow main spar extending along the wing can conveniently form this manifold.

One form of the invention invention is shown in the accompanying drawings, of which:

Figure 2 is a cross-section on II—II of Figure 1;

Figure 3 is an enlarged detail on III—III of Figure 2; and

Figure 4 is a further enlarged detail of the non-return valve.

Figure 1:
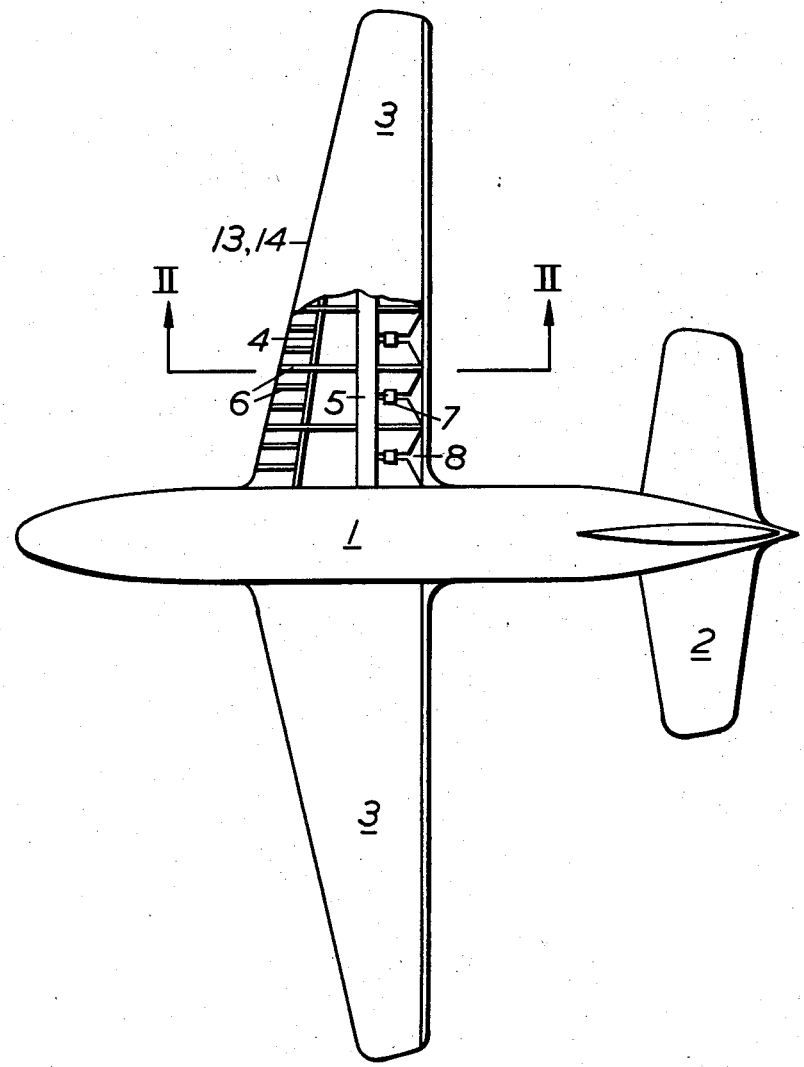
Figure 1 is a view of the aircraft with the wing partly cut away.

In these drawings the aircraft 1 has a tailplane 2 and a wing 3; the structure of each half wing includes a spanwise forward spar 4 and tubular main spar 5, and chordwise stiffeners 6. Mounted behind the main spar 5 are jet engines 7 each of which has a nozzle 8 whereby the engines discharge a propulsive jet issuing as a sheet of gas from the trailing edge of the wing.

The upper and lower walls of the wing are made up of inner skins 9 and 10 and outer skins 11 and 12, spaced apart to form a hollow wall of which the interior serves as passages for inlet air to the engines. The forward ends 13 and 14 of outer skins 11 and 12 are shaped to define, with the forward nose formed by the inner skins 9 and 10, an inlet slot extending along substantially the whole length of the leading edge of each half of the wing 3, from root to wing tip.

The hollow main spar 5 has holes 5a in its wall which furthermore admit air coming from the leading edge inlet through the passages in the wing. Thus although the inlet and the passages are divided into separate air paths by the stiffeners 6 the spar 5 in each half wing serves as a manifold receiving air in common from all the paths in that half wing.

Each engine 7 is mounted as shown in Figure 3 on supports 15 and has its intake duct 7a aligned with an aperture in the wall of the spar 5 so as to receive air from the common manifold. The air enters through a non-return valve located in the duct 7a and consisting of flaps 16a and 16b lying along the duct when the engine is running, hinged to the duct at their upstream edges by hinge-pin 17 and spring biassed so that they tend to spread out. If the engine should fail or be shut down, so that air ceases to be drawn from the manifold into the duct 7a, the hinged flaps tend to open so that they can spread out and close up the inlet duct 7a on any reversal of air flow in that duct. Figure 4 shows the appearance of the hinged flaps when the valve is closed, and is a view looking along arrow IV of Figure 3. The force actuating the flaps 16a and 16b may be augmented by power means such as a fluid-pressure servo device under manual control, and under the control of means responsive to flow in the duct 7a.

We claim:

1. An aircraft comprising a hollow wing formed with an air inlet slot extending along the wing leading edge and including a hollow main spar extending spanwise along and within the wing, said spar being formed with inlet and outlet apertures to and from its interior; a plurality of jet engines mounted within the wing, each engine having an air inlet; air supply passages within the wing from said air inlet slot to said inlet apertures in the spar; and further air supply passages within the wing from said outlet apertures in the spar to each of said engine inlets.

2. An aircraft according to claim 1 further comprising a non-return valve in each said further passage, said valves being arranged to prevent reverse flow from the engine inlets to the outlet apertures in the spar.

3. An aircraft comprising a hollow wing formed with an air inlet slot extending along the wing leading edge; a plurality of jet engines mounted within the wing, each engine having an air inlet; a manifold within the wing formed with inlet and outlet apertures; air supply passages within the wing from said air inlet slot to said inlet apertures of the manifold; and further air supply passages within the wing from said outlet apertures of the manifold to each of said engine inlets.

4. An aircraft comprising a wing formed with a plurality of air inlet slots extending along the wing leading edge; a plurality of jet engines mounted within the wing, each engine having an air inlet; a manifold within the wing formed with inlet and outlet apertures; air supply passages within the wing from each of said inlet slots to said inlet apertures of the manifold; and further air supply passages within the wing from said outlet apertures of the manifold to each of said engine inlets.

5. An aircraft according to claim 4 further comprising a non-return valve in each of said further passages, said valves being arranged to prevent reverse flow from the engine inlets to the outlet apertures of the manifold.

References Cited in the file of this patent
UNITED STATES PATENTS 2,580,339    Woodward _____ Dec. 25, 1951

FOREIGN PATENTS 55,382    France _____ Jan. 9, 1952
(1st addition to Patent No. 971,992)